United States Patent
Brock

(10) Patent No.: US 8,358,240 B2
(45) Date of Patent: Jan. 22, 2013

(54) GENERATING A TIME DETERMINISTIC, SPECTRALLY NONCOHERENT SIGNAL

(75) Inventor: Eddie R. Brock, Rockwall, TX (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 11/777,759

(22) Filed: Jul. 13, 2007

(65) Prior Publication Data

US 2009/0016410 A1 Jan. 15, 2009

(51) Int. Cl.
*G01S 13/00* (2006.01)
*H01Q 15/00* (2006.01)

(52) U.S. Cl. .................................. 342/202; 342/14

(58) Field of Classification Search .......... 342/202–204, 342/134–144, 195, 13, 14
See application file for complete search history.

(56) References Cited

U.S. PATENT DOCUMENTS

| | | | | |
|---|---|---|---|---|
| 4,814,637 A * | 3/1989 | Roessler et al. | | 327/126 |
| 5,777,574 A | 7/1998 | Robinson | | 342/25 |
| 5,920,282 A * | 7/1999 | Vik et al. | | 342/204 |
| 5,959,573 A | 9/1999 | Krikorian et al. | | 342/90 |
| 6,081,226 A | 6/2000 | Caldwell et al. | | 342/200 |
| 6,339,394 B1 | 1/2002 | Cantrell | | 342/159 |
| 6,611,223 B2 * | 8/2003 | Low et al. | | 341/157 |
| 6,683,561 B1 | 1/2004 | Tait et al. | | 342/175 |
| 6,724,269 B2 * | 4/2004 | Joe | | 331/107 T |
| 6,778,603 B1 * | 8/2004 | Fullerton et al. | | 375/238 |
| 6,822,605 B2 * | 11/2004 | Brosche | | 342/130 |
| 6,917,327 B2 * | 7/2005 | Jenkins | | 342/202 |
| 7,095,363 B2 * | 8/2006 | Ishii et al. | | 342/70 |
| 7,103,109 B2 * | 9/2006 | Nakache et al. | | 375/295 |
| 7,187,715 B2 * | 3/2007 | Balachandran et al. | | 375/242 |
| 7,418,029 B2 * | 8/2008 | Richards et al. | | 375/150 |
| 2004/0086001 A1 | 5/2004 | Miao et al. | | |
| 2004/0156504 A1 * | 8/2004 | Mo et al. | | 380/210 |
| 2005/0105594 A1 * | 5/2005 | Giannakis et al. | | 375/132 |
| 2007/0075894 A1 | 4/2007 | Thibado et al. | | |
| 2007/0190953 A1 * | 8/2007 | Tan Eng Choon et al. | | 455/127.1 |

OTHER PUBLICATIONS

Wang, Y., et al., "A Fully Integrated CMOS Transmitter Design for IR-UWB Communication Systems," Department of Electrical and Computer Engineering, University of Alberta, Edmonton, Canada, 1-4244-1176-09/07, IEEE, 4 pages, © 2007.
PCT, Notification of Transmittal of the International Search Report and the Written Opinion of the International Searching Authority, or the Declaration, PCT/US2008/069469, 14 pages, Date Mailed Mar. 9, 2009.

* cited by examiner

*Primary Examiner* — Cassie Galt
(74) *Attorney, Agent, or Firm* — Daly, Crowley, Mofford & Durkee, LLP

(57) ABSTRACT

According to one embodiment, a system for generating a signal includes a monocycle generator, one or more temporal modulators, and a pulse shaper. The monocycle generator generates monocycles that form a signal comprising pulses, where a pulse corresponds to one or more monocycles. The temporal modulators provide instructions the monocycle generator to create a specific spectral response in the signal. A pulse shaper individually modulates at least one monocycle of the monocycles corresponding to a pulse to shape the pulse.

18 Claims, 2 Drawing Sheets

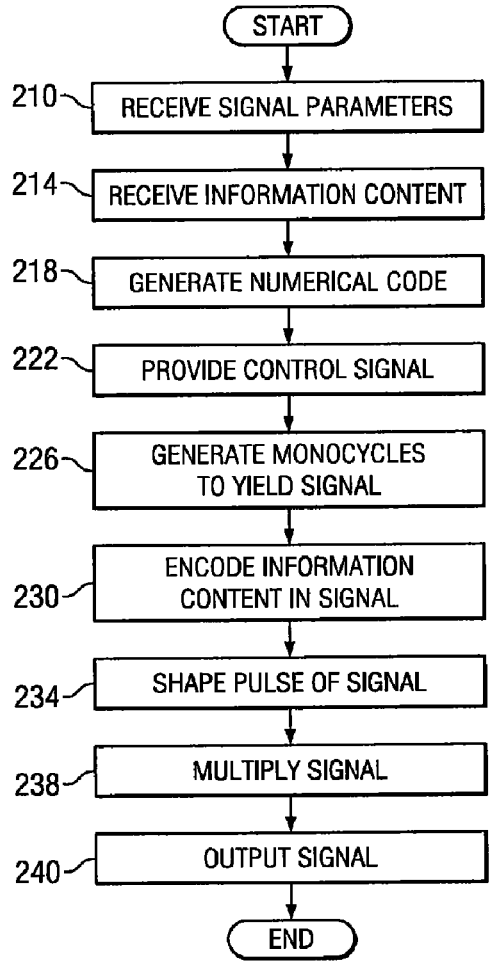
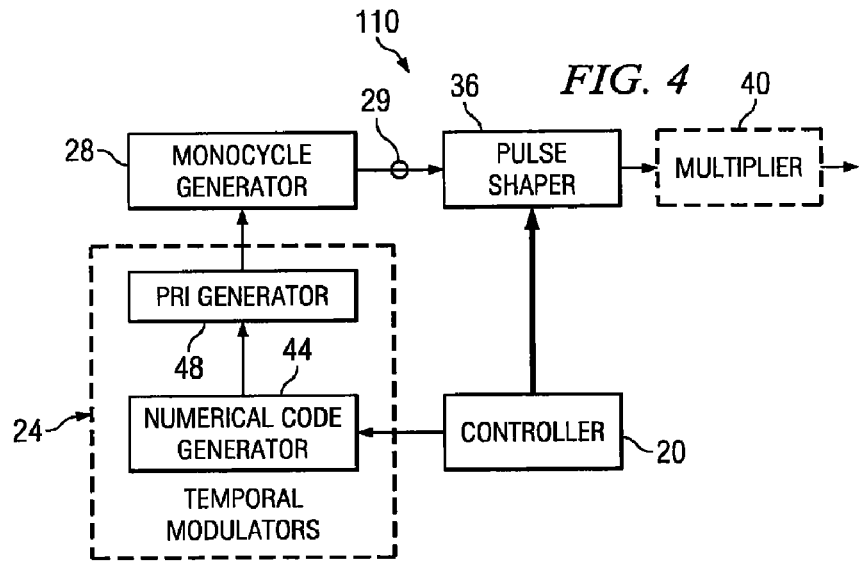

GENERATING A TIME DETERMINISTIC, SPECTRALLY NONCOHERENT SIGNAL

TECHNICAL FIELD

This invention relates generally to the field of signal generation and more specifically to a method and system for generating a time deterministic, spectrally noncoherent signal.

BACKGROUND

A signal generator may generate a signal with specific signal characteristics, such as a specific pulse width or frequency. Known techniques for generating signals include analog techniques and digital techniques. According to a known analog technique, an oscillator may generate a signal, and a switch may be used to control the pulse width of the signal. According to a known digital technique, a signal may be digitally synthesized and then converted to an analog signal. These known techniques, however, may fail to provide satisfactory signals in certain situations, for example, for producing signals at high frequencies (such a microwave or radio frequency (RF) signals) in certain situations.

SUMMARY OF THE DISCLOSURE

In accordance with the present invention, disadvantages and problems associated with previous techniques for generating signals may be reduced or eliminated.

According to one embodiment of the present invention, a system for generating a signal includes a monocycle generator, one or more temporal modulators, and a pulse shaper. The monocycle generator generates monocycles that form a signal comprising pulses, where a pulse corresponds to one or more monocycles. The temporal modulators provide instructions the monocycle generator to create a specific spectral response in the signal according to a time domain process. A pulse shaper individually modulates at least one monocycle of the monocycles corresponding to a pulse to shape the pulse.

Certain embodiments of the invention may provide one or more technical advantages. A technical advantage of one embodiment may be that temporal modulators may be used to generate signals with a noncoherent spectral response while maintaining deterministic time domain processing. The noncoherent spectral response may be generated without lowering the effective information rate versus data rate. The noncoherent spectral response may also result in less interference with other communication signals in the same frequency space.

Another technical advantage of one embodiment may be that a pulse shaping modulator may individually adjust cycles of pulses to shape the pulses of the frequency domain response. The pulses may be shaped for side-lobe reduction. Shaping pulses by individually adjusting cycles may yield more effective pulse shaping.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart illustrating one embodiment of a method for generating a signal that may be used the with system of FIG. 1; and FIG. 4 is a block diagram illustrating one embodiment of a system for generating signals that may be used in an electronic warfare system.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
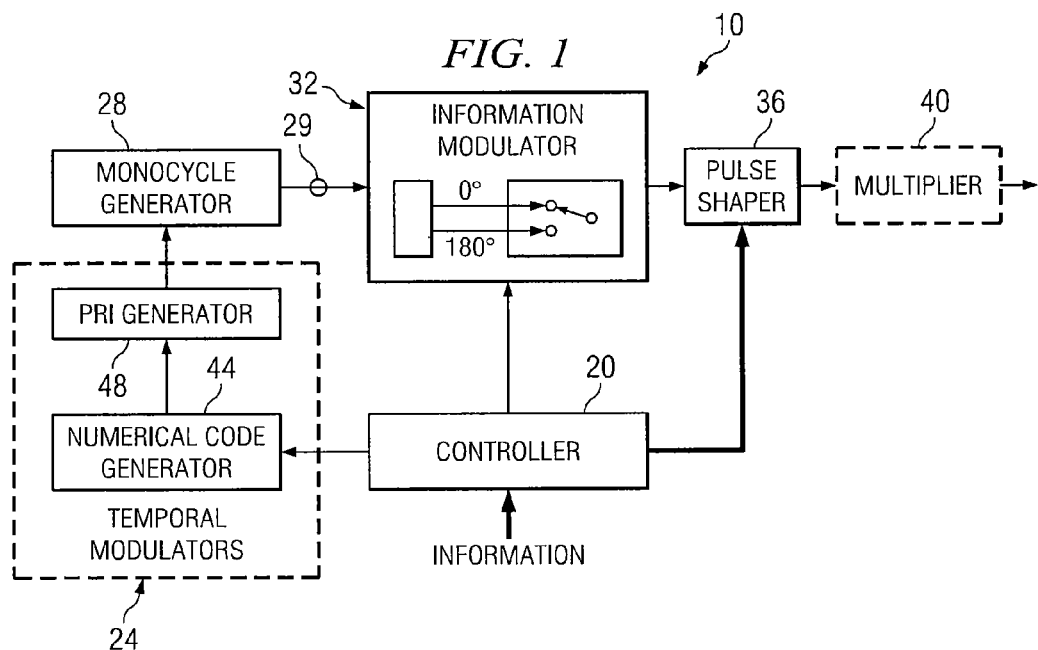
FIG. 1 is a block diagram illustrating one embodiment of a system for generating signals.

FIG. 1 is a block diagram illustrating one embodiment of a system 10 that may be used to generate a signal. According to the embodiment, system 10 may generate a signal that is time deterministic and spectrally noncoherent. The signal may be used in any suitable application. For example, system 10 may generate signals for a communications system, a radar system, or an electronic warfare system.

A signal may refer to a time-varying electronic quantity. A signal has a waveform, such as a sinusoidal or square waveform, comprising pulses. A time deterministic signal may refer to a signal for which the cycles of the signal may be determined. A spectrally noncoherent signal may refer to a signal with noncoherent spectral content.

According to the illustrated embodiment, system 10 includes a controller 20, temporal modulators 24, a monocycle generator 28, an information modulator 32, a pulse shaper 36, and a multiplier 40 coupled as shown. According to one embodiment of operation, controller 20 communicates signal parameters and information content. Signal parameters control the characteristics of the output signal and are communicated to temporal modulators 24. Information content is communicated to information modulator 32. Temporal modulators 24 provide instructions to monocycle generator 28 to yield a noncoherent spectral response in the output signal. Monocycle generator 28 produces monocycles that form the output signal. Information modulator 32 modulates the signal to encode the information content in the signal. Pulse shaper 36 modulates the individual monocycles to shape the pulses of the signal. Multiplier 40 multiples the signal to increase the frequency of the signal.

According to the embodiment, controller 20 may be used to provide the signal parameters that control characteristics of the signal output by system 10. Any suitable characteristic of the output signal may be controlled. For example, the parameters may control temporal features such as timing synchronization, time delay, or other temporal feature. Parameters may control pulse features such as high- and low-voltage pulse levels, pulse attenuation, pulse width, pulse rise time and fall time, peak-average power control, side lobe reduction, or other pulse feature. Parameters may control modulation features, such as the modulation used to encode the signal with information content or temporal modulation features, for example, the numeric code selection.

Controller 20 receives and processes information content to be encoded in the signal. Information content may refer to voice, data, text, audio, video, multimedia, control, signaling, other information, or any combination of the preceding. The information content may be input as binary bits. Controller 20 may place the information content in a format to allow information modulator 32 to encode the information into the signal.

Temporal modulators 24 provide instructions to monocycle generator 28 to create a noncoherent spectral response in the signal. The noncoherent spectral content may be generated using fast Fourier transforms (FFT) and may decrease interference. According to the illustrated embodiment, temporal modulators 24 includes a numerical code generator 44 and a pulse repetition interval (PRI) generator 48.

Numerical code generator 44 provides a numerical code to PRI generator 48. The numerical code may be selected to yield a specific spectral content ranging from classical spectral lines to pseudo-noise characteristics, such as noncoherent spectral content. Any suitable numerical code may be used, such as linear codes, congruent pseudo-random codes, chaotic pseudo-random codes, optimal Golomb ruler pseudo-random codes, other suitable codes, or any combination of the preceding.

PRI generator 48 provides a control signal to monocycle generator 28 that triggers monocycle generator 28. The control signal may instruct monocycle generator 28 to generate monocycles at a specific frequency.

Monocycle generator 28 generates monocycles. A monocycle may refer to a single cycle output from monocycle generator 28, and may have any suitable waveform such as a sinusoidal waveform. The monocycles may be generated at particular frequencies to have specific monocycle periods. Any suitable frequency may be used, for example, greater than or approximately equal to one gigahertz (GHz), greater than or approximately equal to 30 GHz, or greater than or approximately equal to 50 GHz. A signal formed from the monocycles has pulses, where a pulse may be represented by one or more monocycles. The pulse width may be represented by multiples of the monocycle period.

Information modulator 32 modulates the signal to encode information content into the signal. Information modulator 32 may use any suitable modulation method for encoding information content, for example, quadrature amplitude modulation (QAM), frequency shift keying (FSK), amplitude shift keying (ASK), continuous phase modulation (CPM), quadrature amplitude modulation (QAM), or a phase shift keying (PSK) modulation technique such as a binary phase shift key (BPSK) or a quadrature phase shift key (QPSK) modulation technique.

Pulse shaper 36 modulates the monocycles of the signals to shape the pulses of the signal. Any suitable pulse shaping may be performed. As a first example, the pulse width may be modulated by controlling the pulse duration. As a second example, the side lobes of the pulses may be suppressed or reduced using any suitable technique, for example, a Blackman-Harris window technique. As a third example, the amplitude of the pulses may be modulated. An example of pulse shaper 36 is described in more detail with reference to FIG. 2.

Frequency multiplier 40 may be used to multiply the signal to increase the frequency of the output signal. Frequency multiplier 40 may comprise any suitable device, for example, one or more diodes.

System 10 may include other components, such as logic, an interface, and/or a memory. "Logic" may refer to hardware, software, other logic, or any suitable combination of the preceding that may be used to provide information or instructions and/or perform operations. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of numerical code generator 44 and PRI generator 48 may be performed by one module, or the operations of pulse shaper 36 may be performed by more than one module. Additionally, operations of system 10 may be performed using any suitable logic. As used in this document, "each" refers to each member of a set or each member of a subset of a set.

Figure 2:
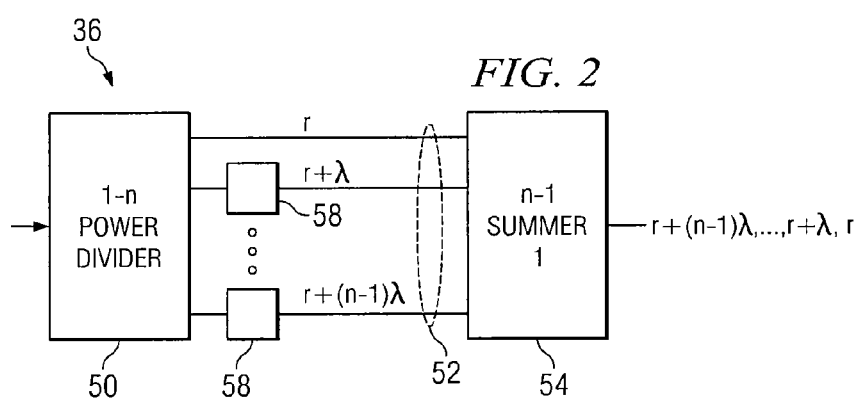
FIG. 2 is a block diagram illustrating one embodiment of a pulse shaper that may be used with the system of FIG. 1.

FIG. 2 is a block diagram illustrating one embodiment of a pulse shaper 36 that may be used with system 10 of FIG. 1. According to the illustrated embodiment, pulse shaper 36 includes power divider 50 and summer 54 coupled by one or more links 52, at least some of which may have attenuators 58.

Power divider 50 represents a 1-to-n power divider that divides a signal S from modulator 32 into n in-phase signals $S_i$, i=1, 2, ..., n, where n represents the number of monocycles of a pulse. Power divider 50 may comprise, for example, a passive microwave power divider.

Links 52 communicate signals from power divider 50 to summer 54, and may introduce delays into signals $S_i$. Delays may be introduced in any suitable manner. As an example, links 52 may include time delay devices, such as passive microwave time delay devices, that introduce time delays. As another example, links 52 may have lengths selected to introduce specific time delays.

According to one embodiment, links 52 may introduce delays into signals $S_i$ to yield consecutive monocycles. According to the embodiment, a link $S_i$ may introduce a delay of $r+k\lambda$, where r represents a reference value, $\lambda$ represents the period of a monocycle, and k represents any suitable number, such as an integer or a non-integer value. For example, a first link 52 may introduce a delay of r, a second link 52 may introduce a delay of $r+1\lambda$, and so on, and the nth link 52 may introduce a delay of $r+(n-1)\lambda$. According to the embodiment, links 52 yield consecutive monocycles spaced at $1\lambda, 2\lambda, \ldots, n\lambda$.

Pulse shaper 36 may have zero or more attenuators 58, such as passive microwave attenuators. As an example, none, some, or all links 52 may have an attenuator 58. An attenuator 58 of a link 52 adjusts the amplitude of a monocycle of the link 52. Accordingly, monocycles may be individually modulated. The amplitudes of the monocycles may be modulated to implement a discrete window function for complex wave shaping. Examples of functions include Bartlett, Hamming, or other suitable functions.

Summer 54 represents a n-to-1 summer that combines n signals to yield a signal. Summer 54 may comprise, for example, a passive microwave summer.

Modifications, additions, or omissions may be made to pulse shaper 36 without departing from the scope of the invention. The components of pulse shaper 36 may be integrated or separated according to particular needs. Moreover, the operations of pulse shaper 36 may be performed by more, fewer, or other modules. Additionally, operations of pulse shaper 36 may be performed using any suitable logic.

FIG. 3 is a flowchart illustrating one embodiment of a method for generating a signal that may be used with system 10 of FIG. 1. The method starts at step 210, where controller 20 receives signal parameters that control characteristics of the output signal. At step 214, controller 20 receives information content to be communicated by the output signal.

Numerical code generator 44 generates a numerical code at step 218. The numerical code may be used to yield a specific spectral response in the signal. PRI generator 48 provides a control signal at step 222. The control signal is used to trigger generation of the plurality of monocycles. In response to the control signal, monocycle generator 28 generates monocycles at step 226 that form the output signal.

Information modulator 32 encodes the information content in the signal at step 230 by modulating the signal. Pulse shaper 36 shape the pulses of the signal at step 234 by individually modulating the monocycles. Multiplier 40 multiples the signal at step 238 to increase the frequency of the signal. The signal is output at step 240. After outputting the signal, the method ends.

Modifications, additions, or omissions may be made to the method without departing from the scope of the invention. The method may include more, fewer, or other steps. Additionally, steps may be performed in any suitable order without departing from the scope of the invention.

FIG. 4 is a block diagram illustrating one embodiment of a system 110 for generating signals that may be used in an electronic warfare system. According to the illustrated embodiment, system 110 includes controller 20, numerical code generator 44, PRI generator 48, monocycle generator 28, pulse shaper 36, and multiplier 40 coupled as shown. Controller 20 may provide signal parameters, but need not provide information content. Numerical code generator 44, PRI generator 48, monocycle generator 28, signal 29, pulse shaper 36, and multiplier 40 may be as described with reference to FIG. 1.

According to one embodiment, system 110 may be used to generate a signal that interferes with communication between a transmitter and a receiver. System 110 may be configured to generate a signal with a specific characteristics to yield such interference. As an example, the signal may have a specific average power, which may be equal to the peak power multiplied by the duty cycle, where the peak power is a function of the amplitude and the duty cycle is a function of the pulse width and the pulse repetition interval. Other characteristics of the signal may be controlled in order to yield the desired interference, for example, peak power, spectral line interference, or impulse behavior of the receiver.

Modifications, additions, or omissions may be made to system 110 without departing from the scope of the invention. The components of system 110 may be integrated or separated according to particular needs. Moreover, the operations of system 110 may be performed by more, fewer, or other modules. Additionally, operations of system 110 may be performed using any suitable logic.

Certain embodiments of the invention may provide one or more technical advantages. A technical advantage of one embodiment may be that temporal modulators may be used to generate signals with a noncoherent spectral response. The noncoherent spectral response may be generated without lowering the effective information rate versus data rate. Another technical advantage of one embodiment may be that a pulse shaping modulator may individually adjust cycles of pulses to shape the pulses. Shaping pulses by individually adjusting cycles may yield more effective pulse shaping.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A system for generating a signal, comprising:
a monocycle generator configured to generate a plurality of monocycles, each monocycle comprising a single cycle of a sinusoidal waveform, the plurality of monocycles forming a signal comprising a plurality of pulses, a pulse of the plurality of pulses corresponding to one or more monocycles of the plurality of monocycles;
one or more temporal modulators coupled to the monocycle generator and configured to provide instructions the monocycle generator, the instructions comprising a control signal to instruct the monocycle generator to create a noncoherent spectral response in the signal; and
a pulse shaper coupled to the monocycle generator, the pulse shaper configured to receive the plurality of pulses generated by the monocycle generator and perform the following for each pulse of the plurality of pulses:
individually modulate at least one monocycle of the one or more monocycles corresponding to the each pulse to shape the each pulse;
an information modulator coupled between the monocycle generator and the pulse shaper configured modulate the signal for encoding information content into the signal; and
a controller coupled to the information modulator configured to control peak and average power for creating interference between a transmitter and a receiver, wherein the average power is derived from the peak power and a duty cycle, the peak power is derived from amplitude, and the duty cycle is determined by a pulse width and a pulse repetition interval.

2. The system of claim 1, wherein the one or more temporal modulators comprises:
a numerical code generator configured to provide a numerical code to yield a noncoherent spectral response in the signal.

3. The system of claim 1, wherein the one or more temporal modulators comprises:
a pulse repetition interval generator configured to provide a control signal to trigger generation of the plurality of monocycles.

4. The system of claim 1, wherein the pulse shaper is configured to individually modulate the at least one monocycle by:
dividing the signal to separate the one or more monocycles; and
modulating the at least one monocycle individually of the other monocycles of the one or more monocycles.

5. The system of claim 1, wherein the pulse shaper is configured to individually modulate the at least one monocycle by: attenuating an amplitude of the at least one monocycle.

6. The system of claim 1, wherein the signal is time deterministic.

7. The system of claim 1, wherein the signal has a frequency greater than 30 gigahertz.

8. A method for generating a signal, comprising:
generating a plurality of monocycles using a monocycle generator, each monocycle comprising a single cycle of a sinusoidal waveform, the plurality of monocycles forming a signal comprising a plurality of pulses, a pulse of the plurality of pulses corresponding to one or more monocycles of the plurality of monocycles;
providing instructions comprising a control signal to create a noncoherent spectral response in the signal; and
performing the following for each pulse of the plurality of pulses received from the monocycle generator:
individually modulating at least one monocycle of the one or more monocycles corresponding to the each pulse to shape the each pulse;
providing an information modulator coupled between the monocycle generator and the pulse shaper; and
providing a controller coupled to the information modulator to control peak and average power for creating interference between a transmitter and a receiver, wherein the average is derived from the peak power and a duty cycle, the peak power is derived from amplitude, and the duty cycle, is determined by a pulse width and a pulse repetition interval.

9. The method of claim 8, further comprising: modulating the signal to encode information content into the signal.

10. The method of claim 8, wherein providing instructions to create the noncoherent spectral response in the signal comprises:
providing a numerical code to yield a noncoherent spectral response in the signal.

11. The method of claim 8, wherein the control signal is configured to trigger generation of the plurality monocycles.

12. The method of claim 8, wherein individually modulating the at least one monocycle of the one or more monocycles further comprises:
dividing the signal to separate the one or more monocycles; and
modulating the at least one monocycle individually of the other monocycles of the one or more monocycles.

13. The method of claim 8, wherein individually modulating the at least one monocycle of the one or more monocycles further comprises: attenuating an amplitude of the at least one monocycle.

14. The method of claim 8, wherein the signal is time deterministic.

15. The method of claim 8, wherein the signal has a frequency greater than 30 gigahertz.

16. A system for generating a signal, comprising:
a monocycle generator configured to generate a plurality of monocycles, each monocycle comprising a single cycle of a sinusoidal waveform, the plurality of monocycles forming a signal comprising a plurality of pulses, a pulse of the plurality of pulses corresponding to one or more monocycles of the plurality of monocycles;
one or more temporal modulators coupled to the monocycle generator and configured to provide instructions to the monocycle generator, the instructions comprising a control signal to instruct the monocycle generator to create a noncoherent spectral response in the signal, the one or more temporal modulators comprising:
a numerical code generator configured to provide a numerical code to yield a noncoherent spectral response in the signal; and
a pulse repetition interval generator configured to provide the control signal to trigger generation of the plurality of monocycles;
an information modulator coupled to the monocycle generator and configured to modulate the signal to encode information content into the signal; and
a pulse shaper coupled to the monocycle generator, the pulse shaper configured to receive the plurality of pulses generated by the monocycle generator and perform the following for each pulse of the plurality of pulses:
individually modulate at least one monocycle of the one or more monocycles corresponding to the each pulse to shape the each pulse by:
dividing the signal to separate the one or more monocycles; and
modulating the at least one monocycle individually of the other monocycles of the one or more monocycles by attenuating an amplitude of the at least one monocycle, the signal being time deterministic, the signal having a frequency greater than 30 gigahertz.

17. The system of claim 1, wherein the noncoherent spectral response is generated using fast Fourier transforms.

18. The method of claim 8, wherein the noncoherent spectral response is generated using fast Fourier transforms.

* * * * *